(12) United States Patent
Ramirez et al.

(10) Patent No.: US 7,626,796 B2
(45) Date of Patent: Dec. 1, 2009

(54) POWER DISTRIBUTION UNIT WITH TWO POLE CIRCUIT BREAKER

(75) Inventors: Carlos G. Ramirez, Chula Vista, CA (US); Kenneth Brown, Chula Vista, CA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/737,081

(22) Filed: Apr. 18, 2007

(65) Prior Publication Data

US 2008/0259533 A1     Oct. 23, 2008

(51) Int. Cl.
*H02H 3/08* (2006.01)
*H02H 9/02* (2006.01)
*H02H 3/06* (2006.01)
*H02H 9/08* (2006.01)

(52) U.S. Cl. .................. 361/93.1; 361/93.2; 361/93.4; 361/93.9

(58) Field of Classification Search ................ None
See application file for complete search history.

(56) References Cited

U.S. PATENT DOCUMENTS

| | | | | |
|---|---|---|---|---|
| 5,721,934 A | * | 2/1998 | Scheurich | 713/320 |
| 5,889,643 A | * | 3/1999 | Elms | 361/42 |
| 6,086,397 A | * | 7/2000 | Chapman et al. | 439/214 |
| 6,618,232 B2 | * | 9/2003 | Huang et al. | 361/93.2 |
| 7,099,130 B2 | * | 8/2006 | Angle et al. | 361/44 |
| 2008/0043387 A1 | * | 2/2008 | Weil | 361/42 |

OTHER PUBLICATIONS

Eaton/Cutler-Hammer Meter Breakers Technical Data, pp. 1-28, dated Aug. 2001.
National Electrical Code, National Fire Protection Association (2005), Sections 550.11(C) and 647.4.

* cited by examiner

*Primary Examiner*—Albert W Paladini
*Assistant Examiner*—Dharti H Patel
(74) *Attorney, Agent, or Firm*—Davis Wright Tremaine LLP; George C. Rondeau, Jr.; Heather M. Colburn

(57) ABSTRACT

A power distribution unit includes a two pole circuit breaker having a first pole electrically coupled to an x-phase circuit portion of the power distribution unit and having a second pole electrically coupled to a y-phase circuit portion of the power distribution unit. The two pole circuit breaker is so designed that both of the two poles of the circuit breaker trip simultaneously and open even when an undesired electrical condition exists on the portion of the power distribution unit electrically coupled to only one of the poles.

24 Claims, 13 Drawing Sheets

POWER DISTRIBUTION UNIT WITH TWO POLE CIRCUIT BREAKER

BACKGROUND OF THE INVENTION

1. Field of the Invention

The present invention is directed generally to power distribution units.

2. Description of the Related Art

Single-phase electrical devices may be electrically coupled to a three-phase system, either by connecting between a phase conductor and the system neutral (line-to-neutral) or by connecting across two phase conductors in a phase-to-phase connection. In North America, lighting and small appliance outlets are typically connected line-to-neutral to give the 120 V distribution voltage (115V utilization voltage), and high-power loads such as cooking equipment, space heating, water heaters, or air conditioning can be connected across two phases in a phase-to-phase connection to provide approximately 208 V. The use of 208 V is widespread enough that in North America 208 V single-phase equipment can be relatively easy to find. The 208 V connection is preferred for high-power appliances because it can provide almost double the amount of power for the same current and wire size. When power demands increase, it is possible to reconfigure existing wiring in a building in the United States from a standard line-to-neutral 120 V single phase power to phase-to-phase 208 V single phase power.

Conventional power distribution units generally have a plurality of electrical outlets also known as electrical receptacles that couple to electrical power to furnish electrical power to devices electrically coupled to the receptacles. For 208V electrical distribution, the electrical outlets typical have three openings to receive three prongs of the electrical plugs. A first prong of each of the plugs is used to electrically couple the device to an electrical ground. A second prong of each of the plugs is used to electrically couple the device to a first phase (such as an x-phase) related part of an electrical power source. A third prong of each of the plugs is to electrically couple the device to a second phase (such as a y-phase) related part of the electrical power source. The power distribution units have two separate circuit portions that electrically couple first phase and second phase related portions, respectively, of the electrical power source to each of the plurality of electrical outlets.

To address concerns including those related to safety, a conventional power distribution unit may use one or two circuit breakers each of a single pole type that are each electrically coupled to a different one of the first phase and second phase circuit portions of the power distribution unit. In a first case of conventional use, only one single pole circuit breaker is used for a power distribution unit. For this first case, the one single pole circuit breaker is electrically coupled to one of the circuit portions associated with one of the two phases of an electrical power source. For example, in this first case, the x-phase circuit portion of the power distribution unit may be coupled to a sole single pole circuit breaker whereas the y-phase circuit portion of the power distribution unit may not be coupled to any circuit breaker at all.

In a second case of conventional use, two single pole circuit breakers, a first single pole circuit breaker and a second single pole circuit breaker, are used for the power distribution unit. For this second case, the first single pole circuit breaker can be coupled to the x-phase circuit portion of the power distribution unit. Furthermore, for this second case, the second single pole circuit breaker can be coupled to the y-phase circuit portion of the power distribution unit. For example, the first single pole breaker could be coupled to the x-phase circuit portion of the power distribution unit.

In the first case, where a power distribution unit uses only one single pole breaker, a dangerous situation could occur. As an example, the sole single pole circuit breaker could be electrically coupled to the x-phase circuit portion of the power distribution unit whereas in this case the y-phase circuit portion of the power distribution unit would be not electrically coupled to a circuit breaker. If a condition developed that caused the sole single pole circuit breaker to trip open, then the x-phase circuit portion of the power distribution unit would not be electrically coupled to the x-phase portion of electrical power.

In this example of the first case, if a user made electrical contact with the x-phase circuit portion of the power distribution unit and also made electrical contact with a relative electrical ground, the user would receive no electrical current from the x-phase portion of the electrical power source. On the other hand, in this first case, the y-phase circuit portion of the electrical power distribution unit is not electrically coupled to a circuit breaker and consequently remains electrically coupled to the y-phase portion of the electrical power source.

In this example of the first case, if a user made electrical contact with the y-phase circuit portion of the power distribution unit (in particular making electrical contact with the associated y-phase conductor of one of the electrical outlets) and also made electrical contact with a relative electrical ground, the user would receive undesired electrical current from the y-phase portion of the electrical power source. This could be quite a surprise to the user, since the user may assume that since the sole single pole circuit breaker was tripped open that both the x-phase circuit portion of the power distribution unit was not electrically coupled to the x-phase portion of the electrical power source and the y-phase circuit portion of the power distribution unit was not electrically coupled to the y-phase portion of the electrical power source.

In the second case, where a power distribution unit uses one single pole circuit breaker for the x-phase circuit portion of the power distribution unit and uses another single pole circuit breaker for the y-phase circuit portion of the power distribution unit, a similarly dangerous situation could occur. As an example, a first single pole circuit breaker could be electrically coupled to the x-phase circuit portion of the power distribution unit and a second single pole circuit breaker could be electrically coupled to the y-phase circuit portion of the power distribution unit.

An electrical condition, such as an overcurrent condition, could develop that causes the first single pole circuit breaker to trip open, so that the x-phase circuit portion of the power distribution unit would not be electrically coupled to the x-phase portion of the electrical power source. However, for this same electrical condition, the second single pole circuit breaker may not be tripped open, so that the y-phase circuit portion of the power distribution unit would still be electrically coupled to the y-phase portion of the electrical power source.

In this example of the second case, if a user made electrical contact with the x-phase circuit portion of the power distribution unit and also made electrical contact with a relative electrical ground, the user would receive no electrical current from the x-phase portion of the electrical power source. On the other hand, the y-phase circuit portion of the electrical power distribution unit remains electrically coupled to the y-phase portion of the electrical power source.

In this example of the second case, if a user made electrical contact with the y-phase circuit portion (in particular making electrical contact with the associated y-phase conductor of one of the electrical outlets) of the power distribution unit and also made electrical contact with a relative electrical ground, the user would receive undesired electrical current from the y-phase portion of the electrical power source. This could be quite a surprise to the user, since the user may assume that both of the two circuit breakers found in the power distribution unit have tripped open or the user may assume that since one of the two circuit breakers has tripped open that the power distribution unit is somehow in any case not electrically coupled to a portion of the electrical power source.

BRIEF DESCRIPTION OF THE SEVERAL VIEWS OF THE DRAWING(S)

DETAILED DESCRIPTION OF THE INVENTION

As described further below, a power distribution unit includes a two pole circuit breaker having a first pole electrically coupled to an x-phase circuit portion of the power distribution unit and having a second pole electrically coupled to a y-phase circuit portion of the power distribution unit. The two pole circuit breaker is so designed that both of the two poles of the circuit breaker trip open even when an undesired condition exists only on that portion of the power distribution unit electrically coupled to only one of the poles.

By using the two pole circuit breaker, both the x-phase circuit portion and the y-phase circuit portion will be electrically disconnected from the electrical power source whenever a condition solely exists on only the x-phase circuit portion or the y-phase circuit portion of the power distribution unit causing the circuit breaker to trip open. Also, both the x-phase circuit portion and the y-phase circuit portion will be electrically disconnected from the electrical power source whenever conditions exist on both the x-phase circuit portion and the y-phase circuit portion of the power distribution unit that would cause the circuit breaker to trip open.

Figure 1:
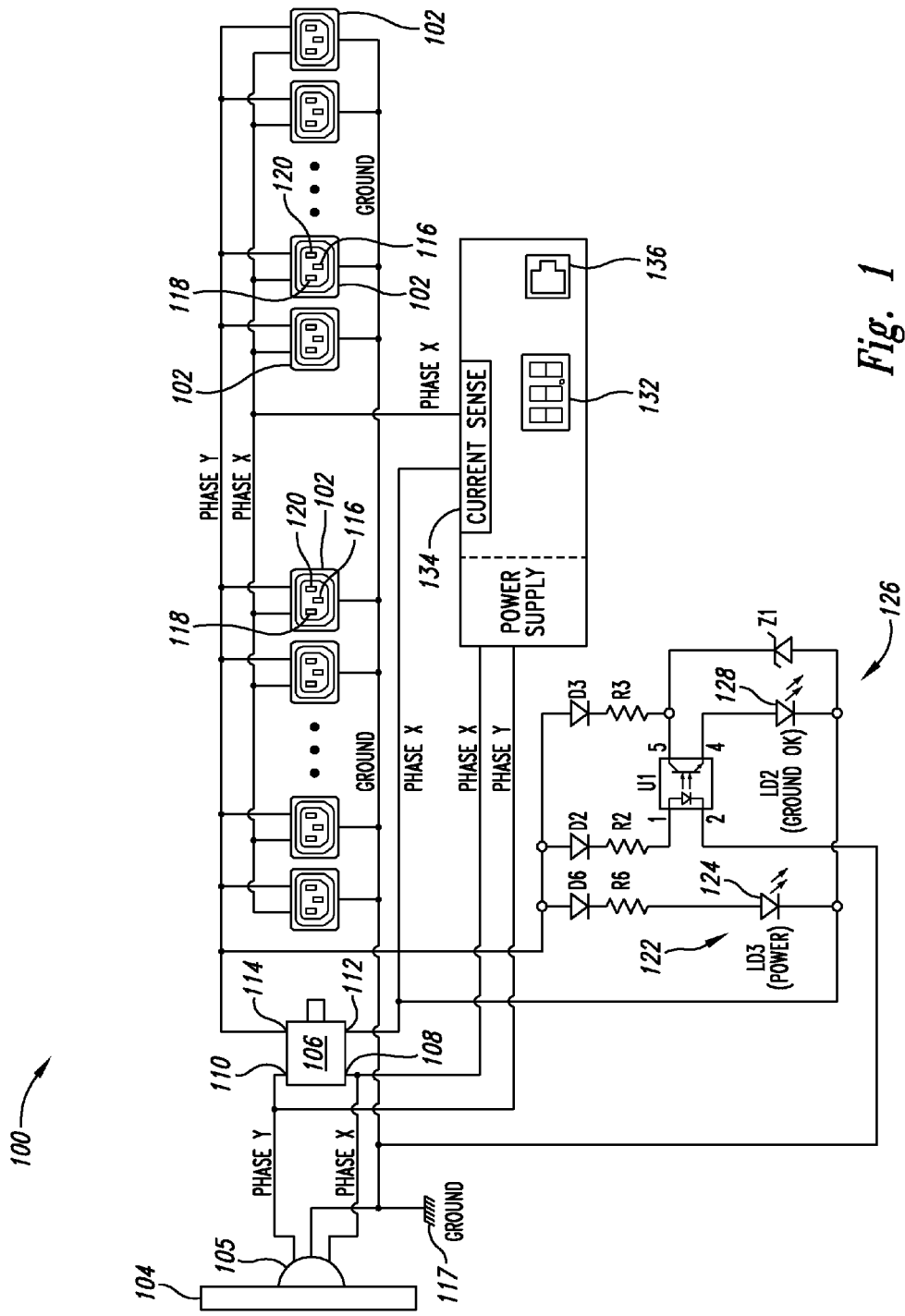
FIG. 1 is a schematic circuit diagram of an implementation of the power distribution unit of the present invention.

As depicted in FIG. 1, a power distribution unit 100 includes electrical receptacles 102 electrically coupled to an electrical power source 104 through an electrical plug 105 and furthermore through a two pole circuit breaker 106, which has a first input terminal 108, a second input terminal 110, a first output terminal 112, and a second output terminal 114. The first input terminal 108 of the two pole circuit breaker 106 is electrically coupled to the x-phase line of the electrical power source 104 through the electrical plug 105. The second input terminal 110 of the two pole circuit breaker 106 is electrically coupled to the y-phase line of the electrical power source 104 through the electrical plug 105.

In other implementations, the power distribution unit 100 is coupled to an electrical power source 104 without need of the electrical plug 105. Each of the receptacles have a first connector 116 electrically coupled to an electrical ground 117, a second connector 118 electrically coupled to the first output terminal 112 of the two pole circuit breaker, and a third connector 120 electrically coupled to the second output terminal 114 of the two pole circuit breaker.

In operation, when the two pole circuit breaker 106 is closed, the second connector 118 of each of the electrical receptacles 102 will be electrically coupled to x-phase line of the electrical power source 104 and the third connector 120 of each of the electrical receptacles 102 will be electrically coupled to the y-phase line of the electrical power source 104. When such unsafe electrical conditions occur as an overcurrent condition in an electrical portion coupled to the two pole circuit, in either the x-phase line or the y-phase line or in both, the two pole circuit breaker 106 will switch open.

In this open condition of the two pole circuit breaker 106, the second connector 118 of each of the electrical receptacles 102 will no longer be electrically coupled to the x-phase line of the electrical power source 104 and the third connector 120 of each of the electrical receptacles 102 will no longer be electrically coupled to the y-phase line of the electrical power source 104 until the two pole circuit breaker is reset. Since both the second connector 118 and the third connector 120 of each of the electrical receptacles 102 are uncoupled from the electrical power source 104 when the two pole circuit breaker 106 is tripped open, a user will not be at risk of receiving unexpected current as with the conventional power distribution units described above. Typical sizes of the two pole circuit breaker 106 can include 15, 20, and 30 amp current levels as well as other current levels.

As depicted, the power distribution unit 100 further includes a light emitting diode (LED) (LD3) 124 power indicating circuit 122 configured to illuminate an LED (LD3) 124 when the two poles of the two pole circuit breaker 106 are closed. Illumination of the LED (LD3) 124 by the LED (LD3) power indicating circuit 122 gives visual indication to a user of the power distribution unit 100 that electrical power is available to the plurality of the electrical receptacles 102. The power distribution unit 100 also includes an LED (LD2) ground indicating circuit 126 configured to illuminate a LED (LD2) 128 when the first connector 116 of each of the electrical receptacles 102 is electrically coupled to the electrical ground 117.

Furthermore, the implementation of the power distribution unit 100 depicted in FIG. 1 includes a true root mean squared (RMS) current meter monitoring display 132 coupled with a current sense circuit 134 and includes an RJ45 connector 136 for Ethernet connectivity. The current sense circuit 134 is shown in FIG. 1 as being electrically coupled into the x-phase electrical line that runs from the first output terminal 112 of the two pole circuit breaker 106 through the current sense circuit and on to the second connector 118 of each of the electrical receptacles 102. In other implementations the y-phase electrical line can be coupled to a current sense circuit.

Figure 2:
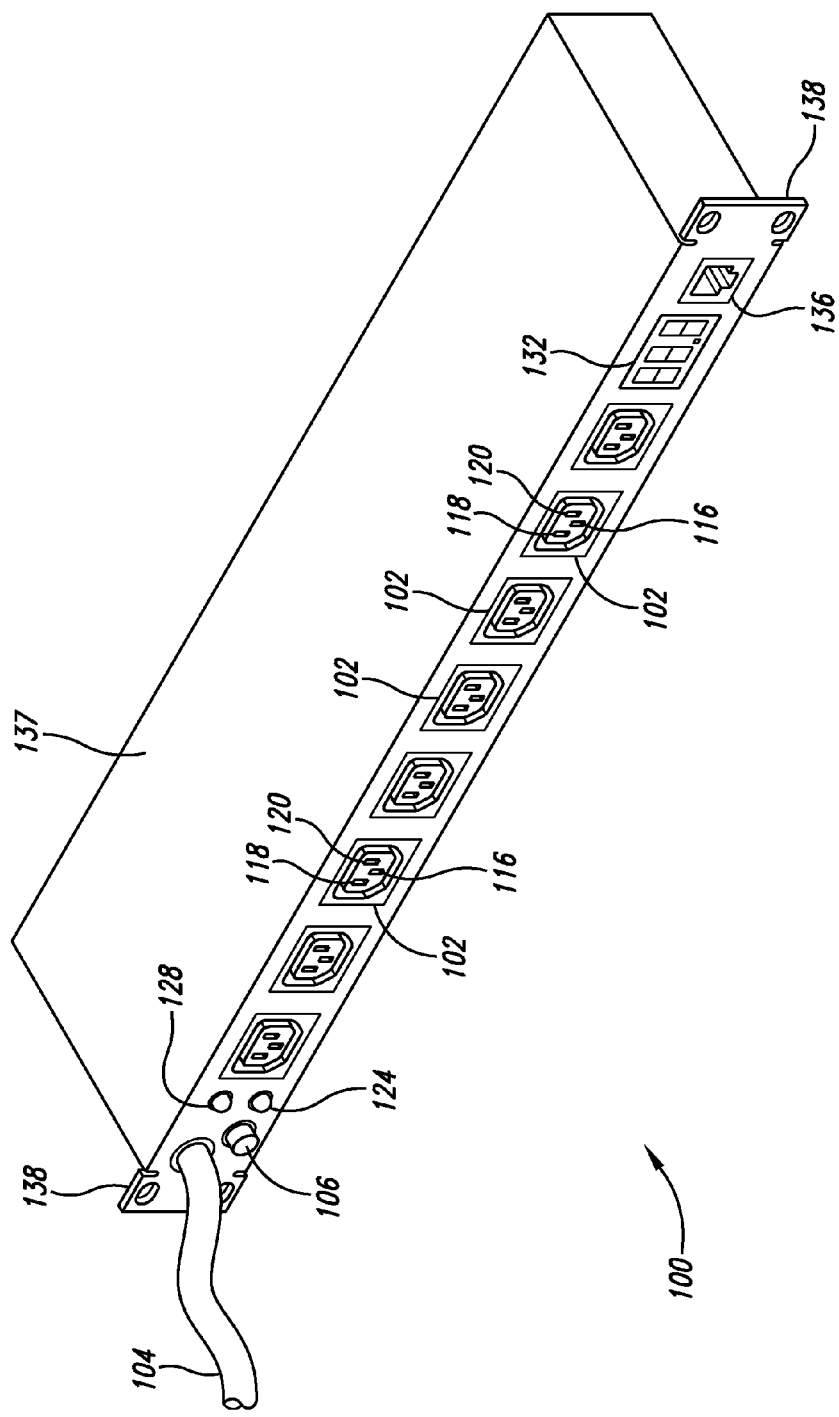
FIG. 2 is a front perspective view of a single front row implementation of the power distribution unit.
Figure 3:
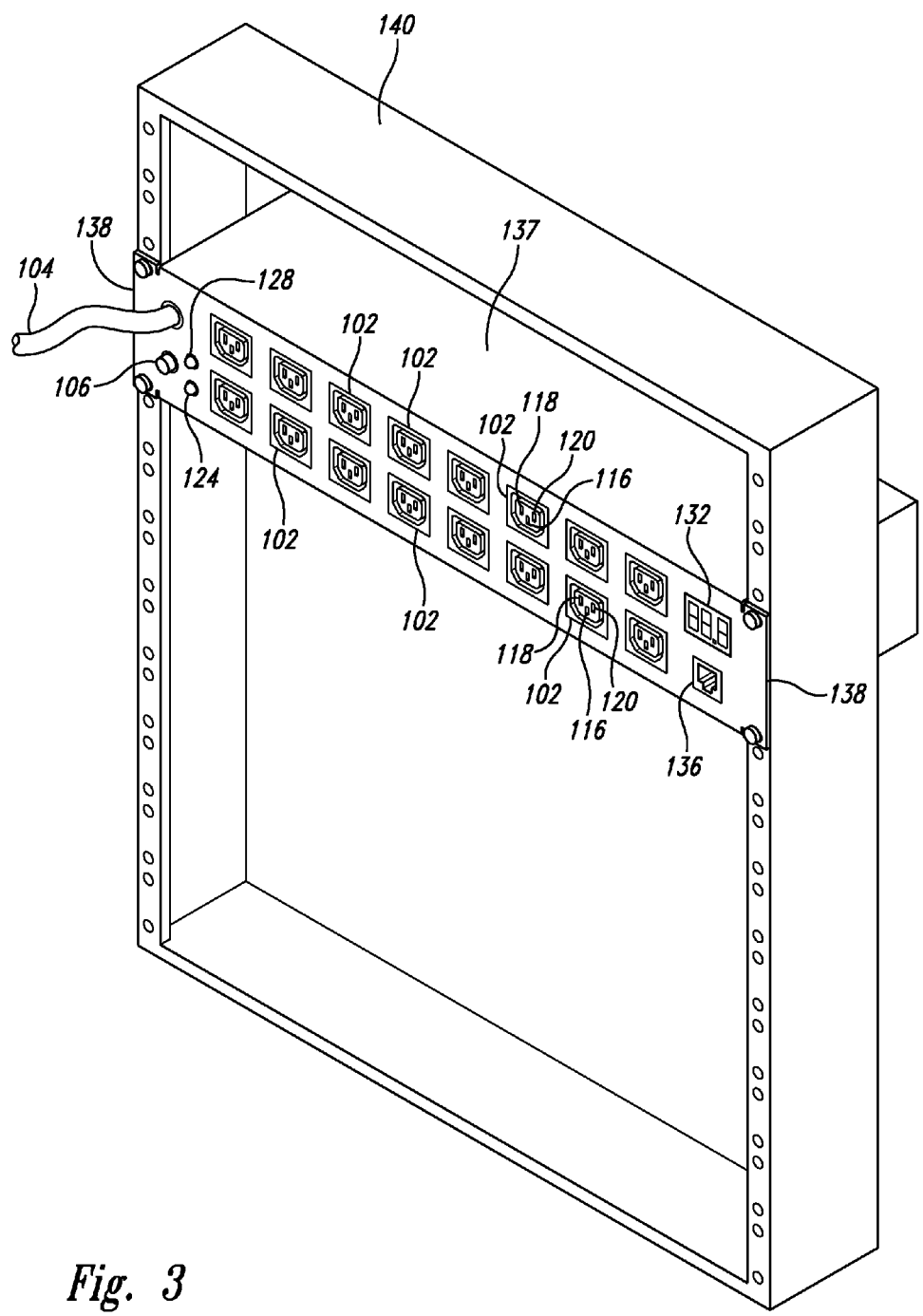
FIG. 3 is a front perspective view of a dual front row implementation of the power distribution unit as shown in an equipment rack.
Figure 4:
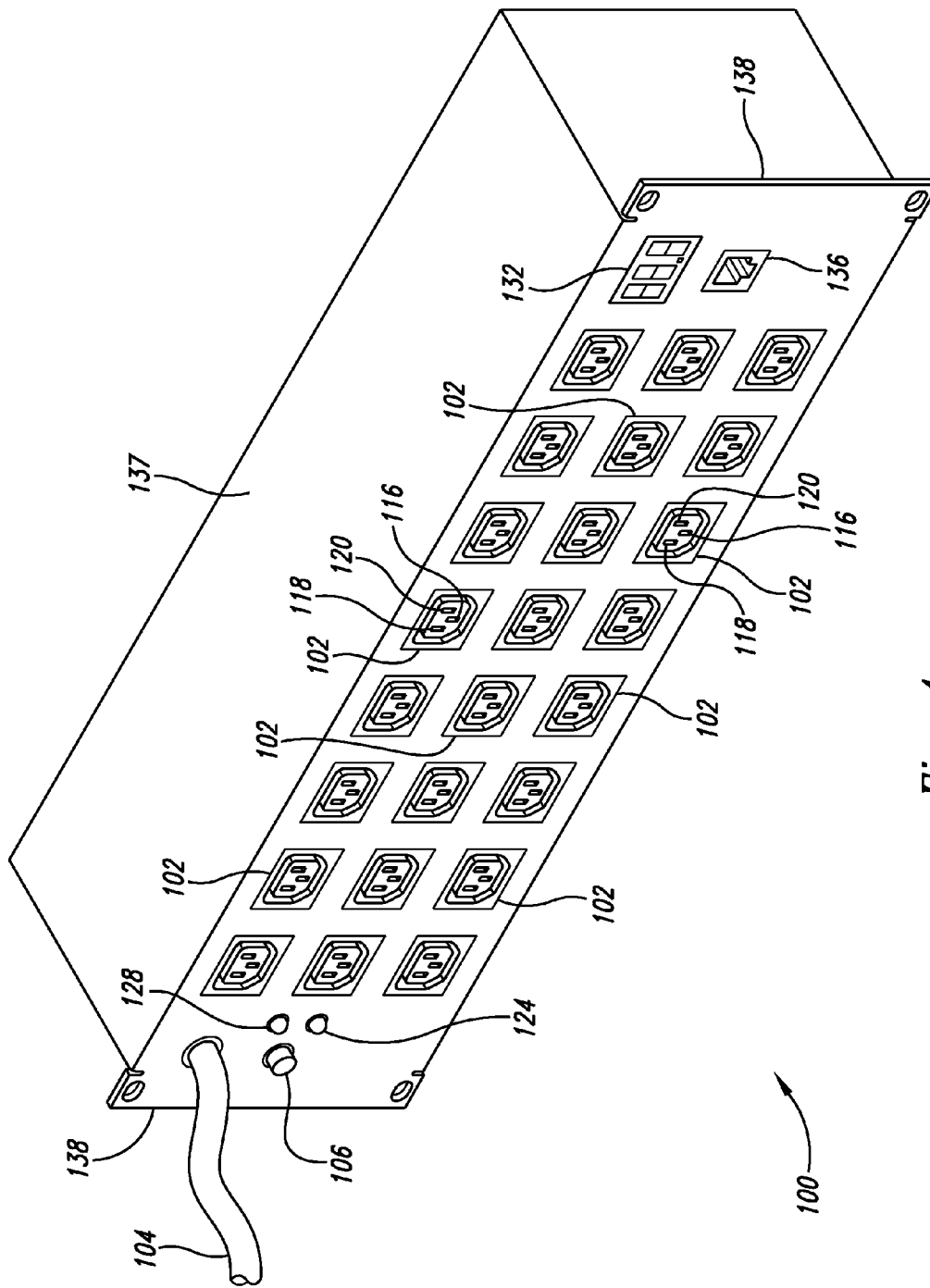
FIG. 4 is a front perspective view of a triple front row implementation of the power distribution unit.

A single front row implementation of the power distribution unit 100 is shown in FIG. 2 as including the chassis 137. The chassis 137 is shown to include brackets 138 for mounting on an equipment rack 140 as shown in FIG. 3 for a dual front row implementation and also as the brackets on a triple front row implementation shown in FIG. 4. The front row implementations orient the power distribution unit so that the electrical receptacles 102 are located on the same side of the equipment rack 140 facing forward along with the LED (LD3) 124 of the power indicating circuit 122, the LED (LD2) 128 of the ground indicating circuit 126, the true RMS current meter monitoring display 132, and the RJ45 connector 136 for Ethernet connectivity.

Figure 5:
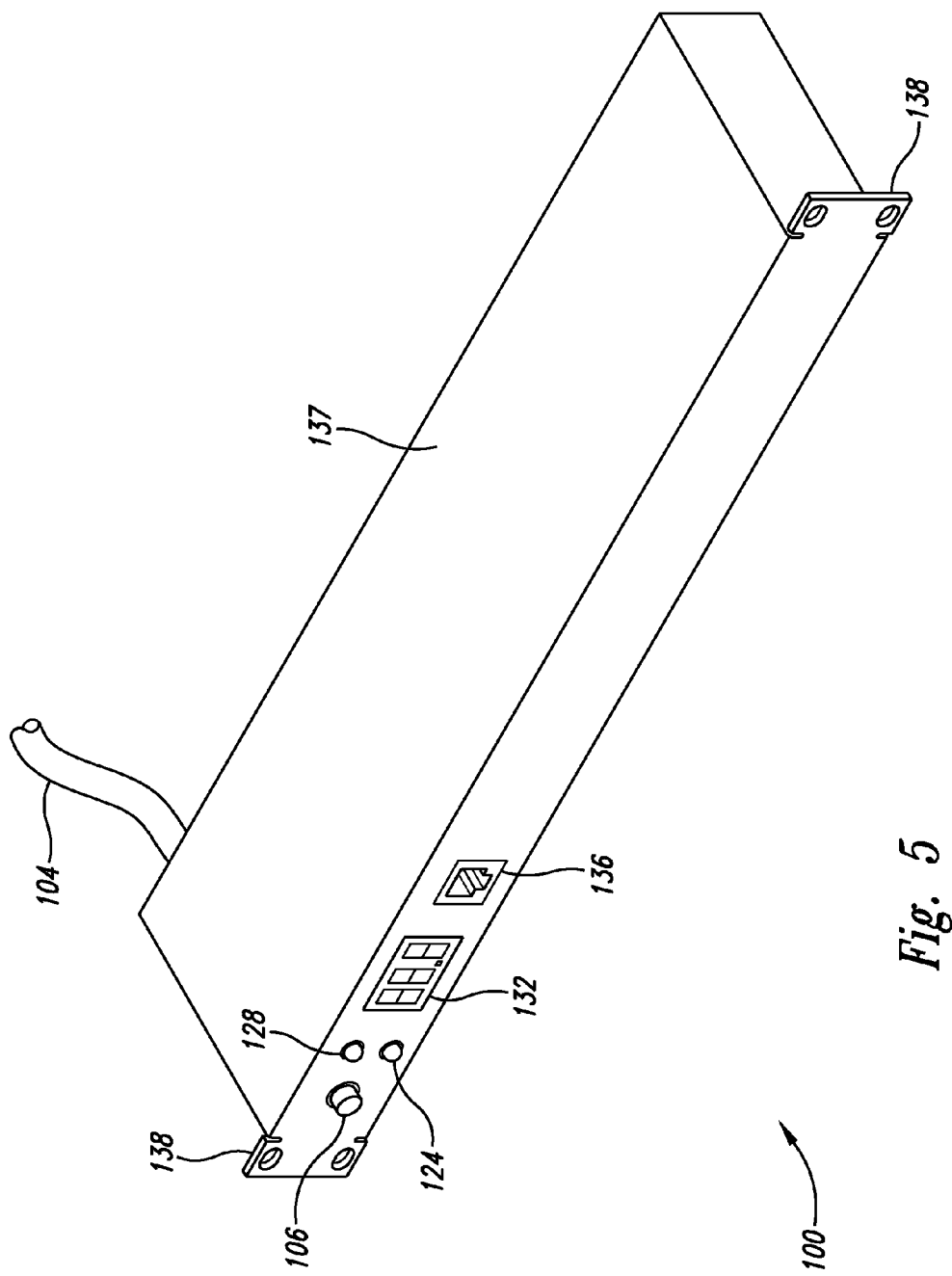
FIG. 5 is a front perspective view of a single rear row implementation of the power distribution unit.
Figure 6:
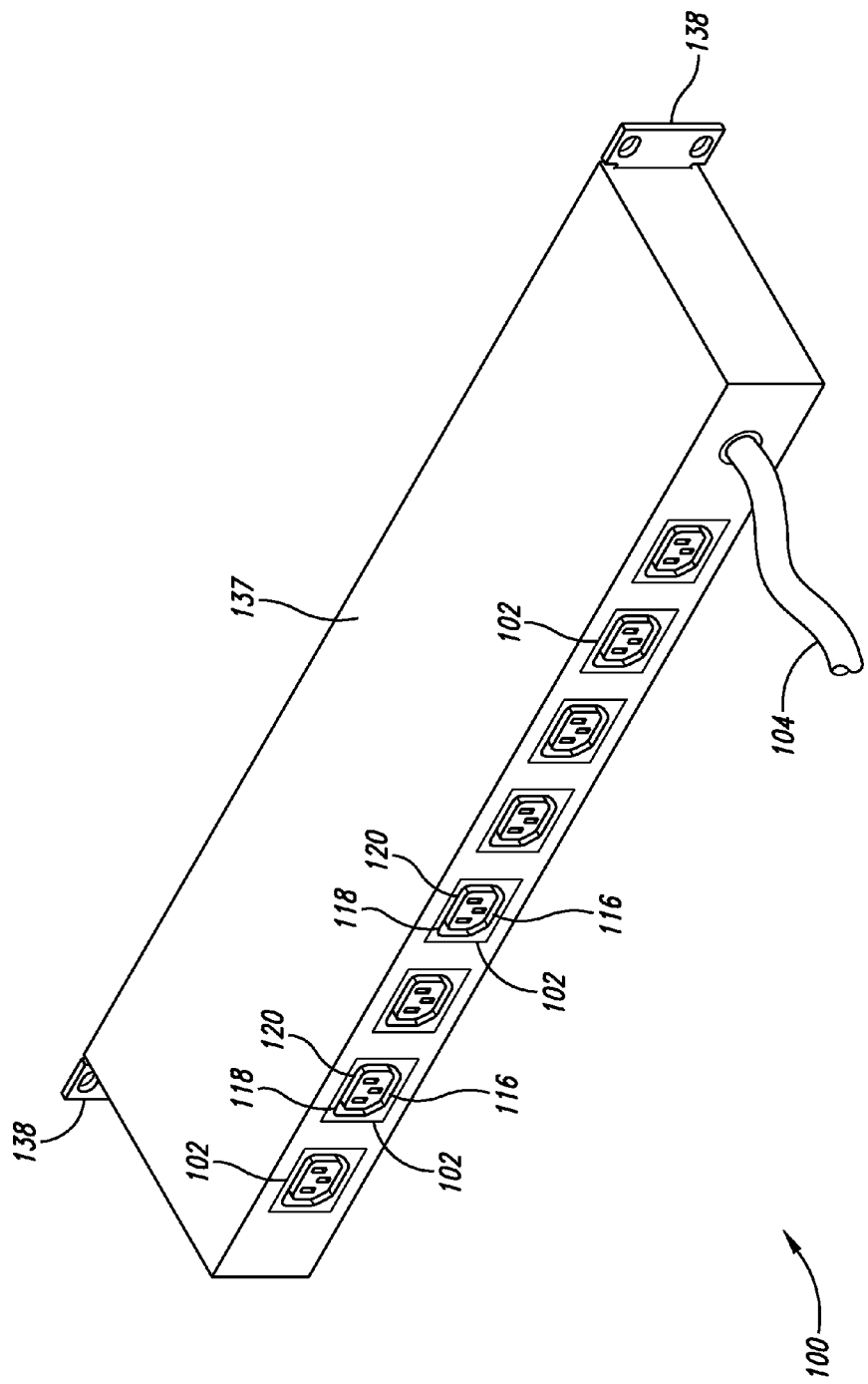
FIG. 6 is a rear perspective view of the single rear row implementation of the power distribution unit of FIG. 5.
Figure 7:
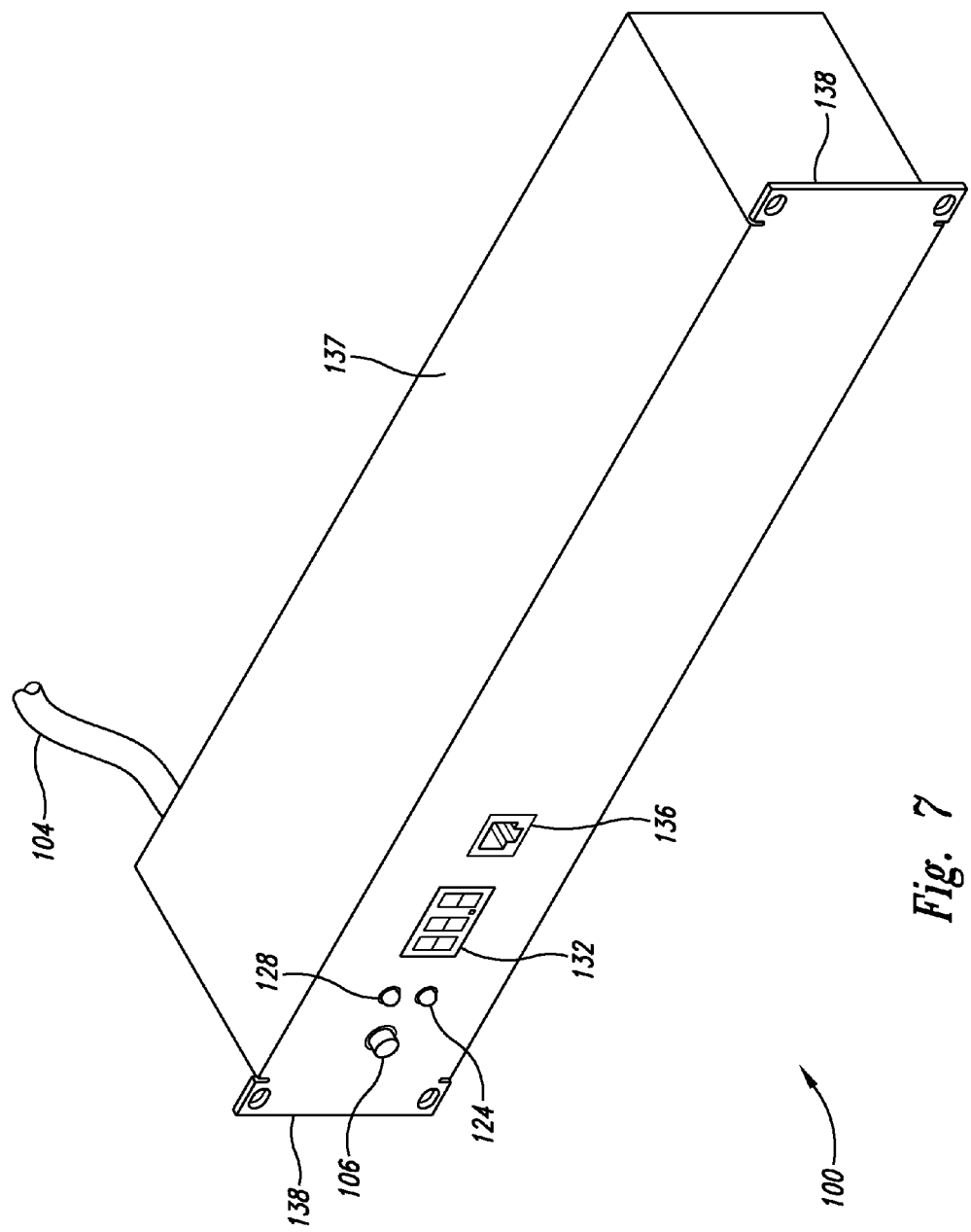
FIG. 7 is a front perspective view of a dual rear row implementation of the power distribution unit.
Figure 8:
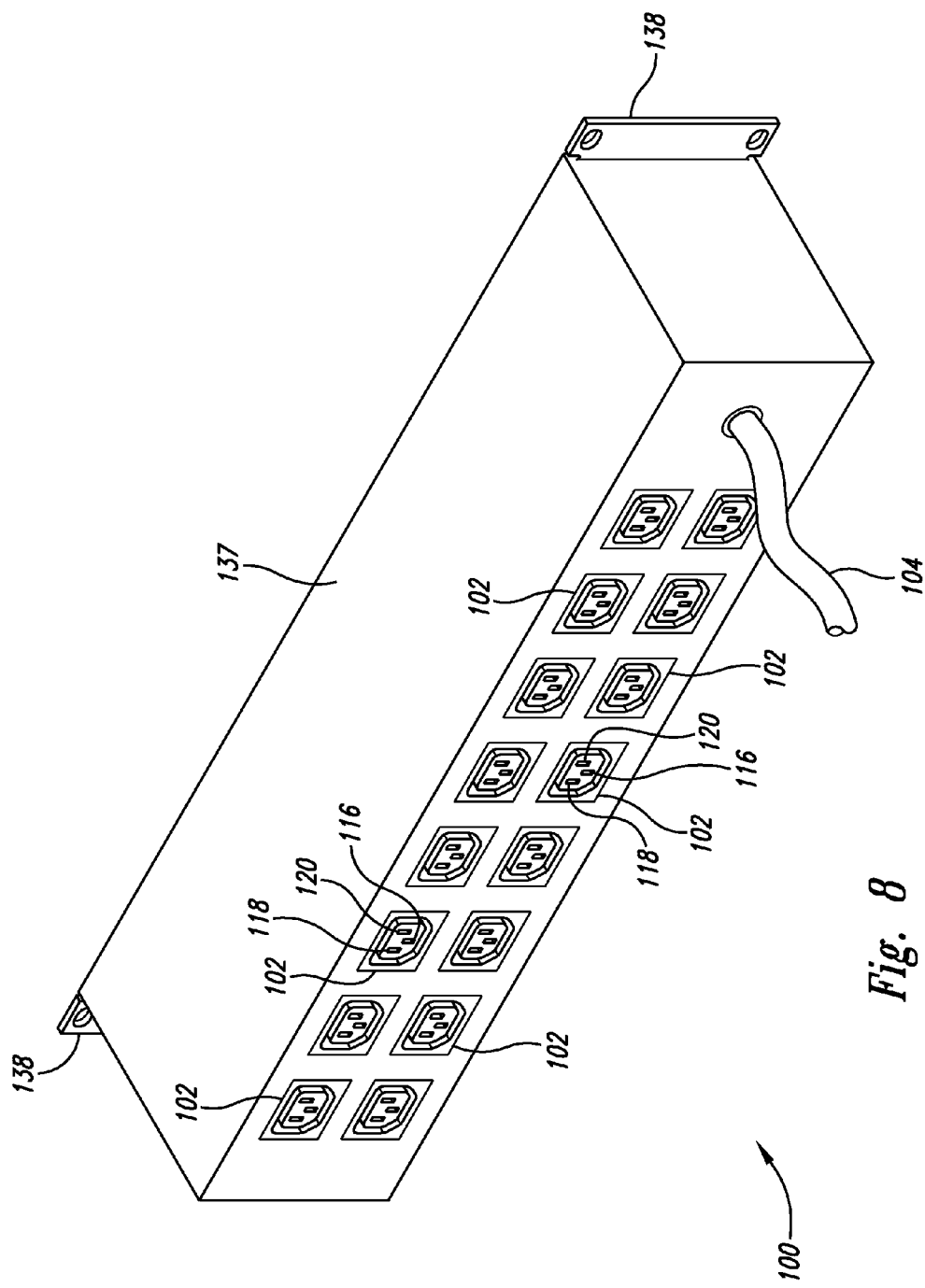
FIG. 8 is a rear perspective view of the dual rear row implementation of the power distribution unit of FIG. 7.
Figure 9:
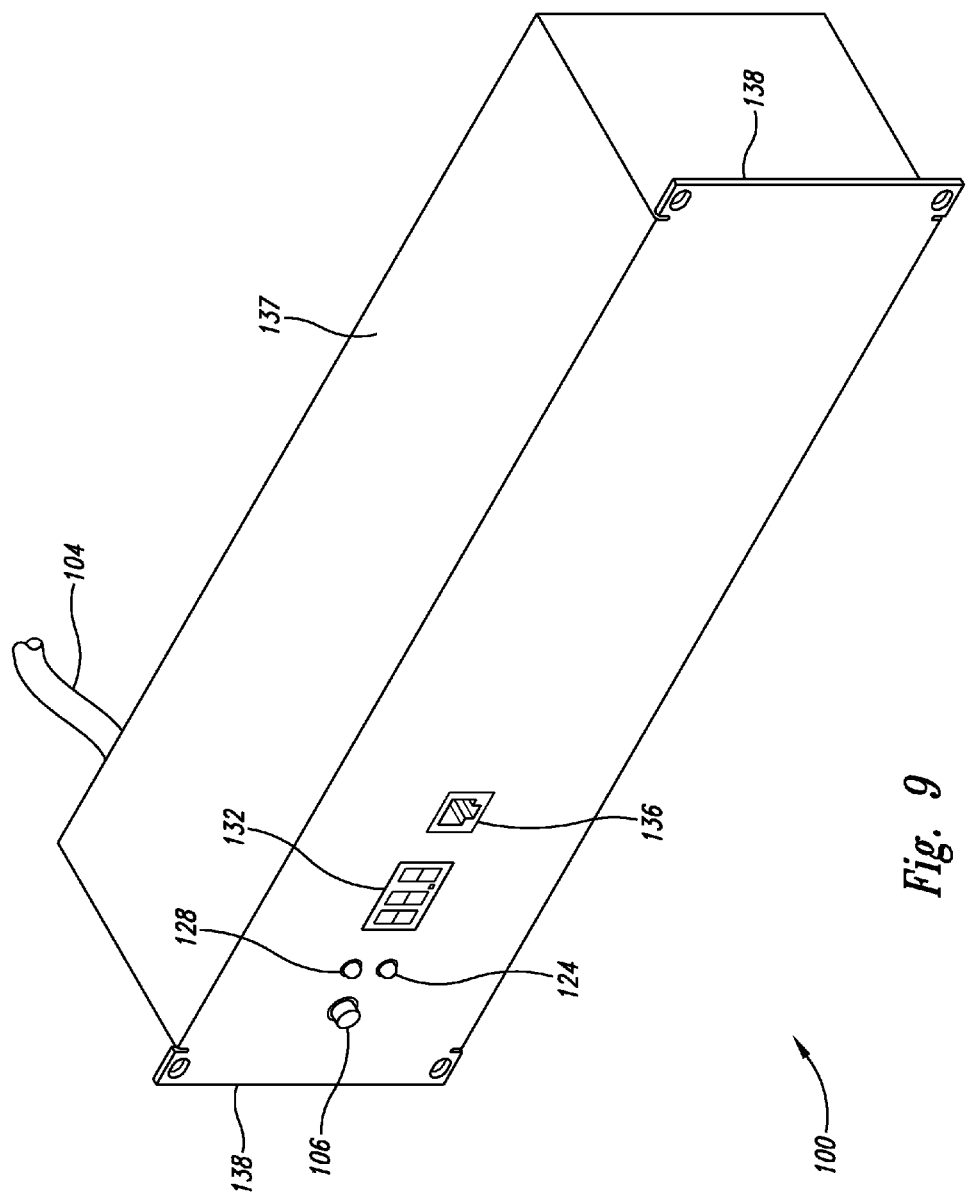
FIG. 9 is a front perspective view of a triple rear row implementation of the power distribution unit.
Figure 10:
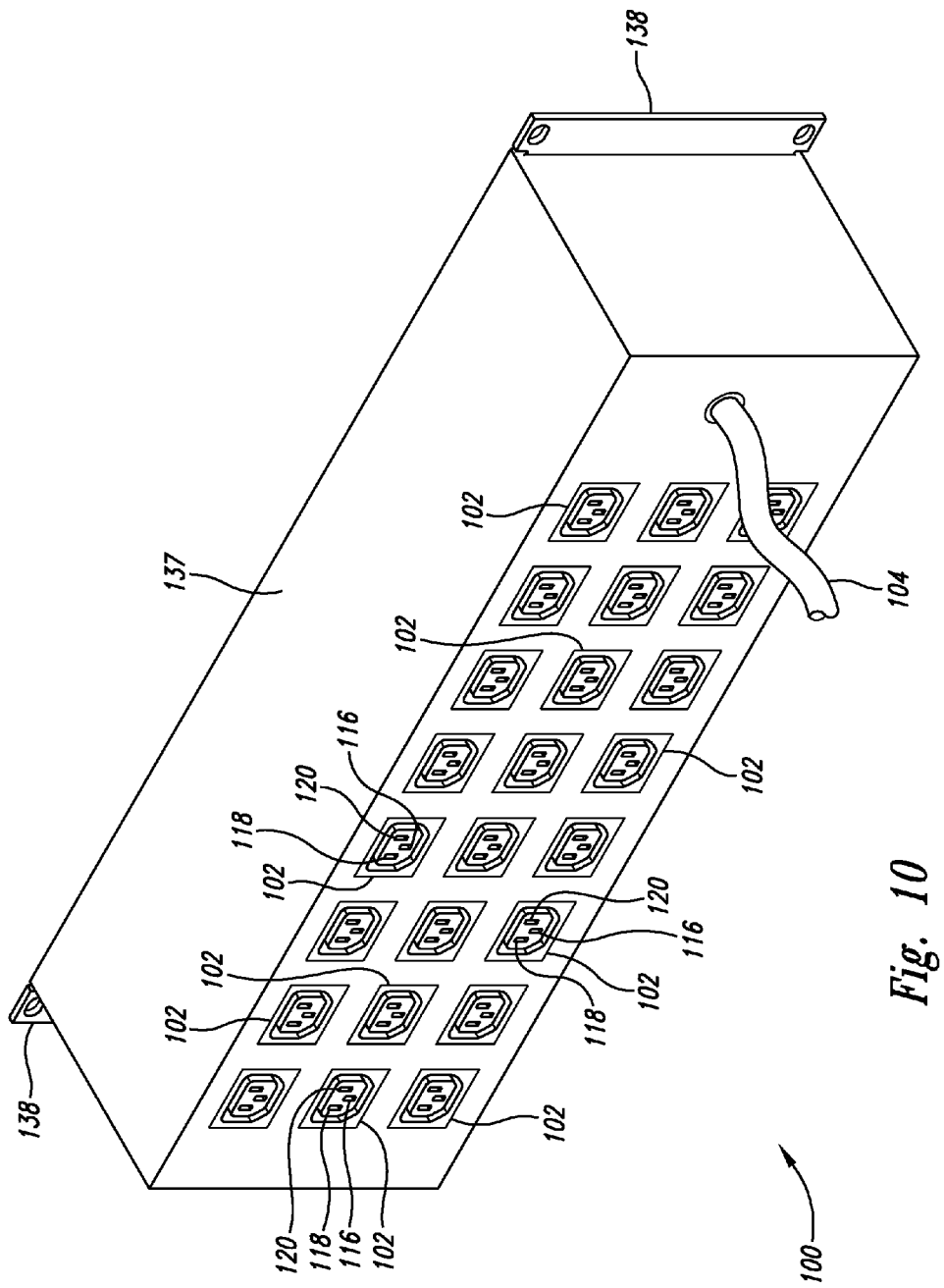
FIG. 10 is a rear perspective view of a triple rear row implementation of the power distribution unit of FIG. 9.

A single rear row implementation shown in FIGS. 5 and 6, a dual rear row implementation shown in FIGS. 7 and 8, and a triple rear row implementation shown in FIGS. 9 and 10 have the brackets 138 positioned and other components oriented so that the LED (LD3) 124 of the power indicating circuit 122, the LED (LD2) 128 of the ground indicating circuit 126, the true RMS current meter monitoring display 132, and the RJ45 connector 136 are forward facing whereas the electrical receptacles 102 are rearward facing when the power distribution unit 100 is mounted in the equipment rack 140.

Figure 11:
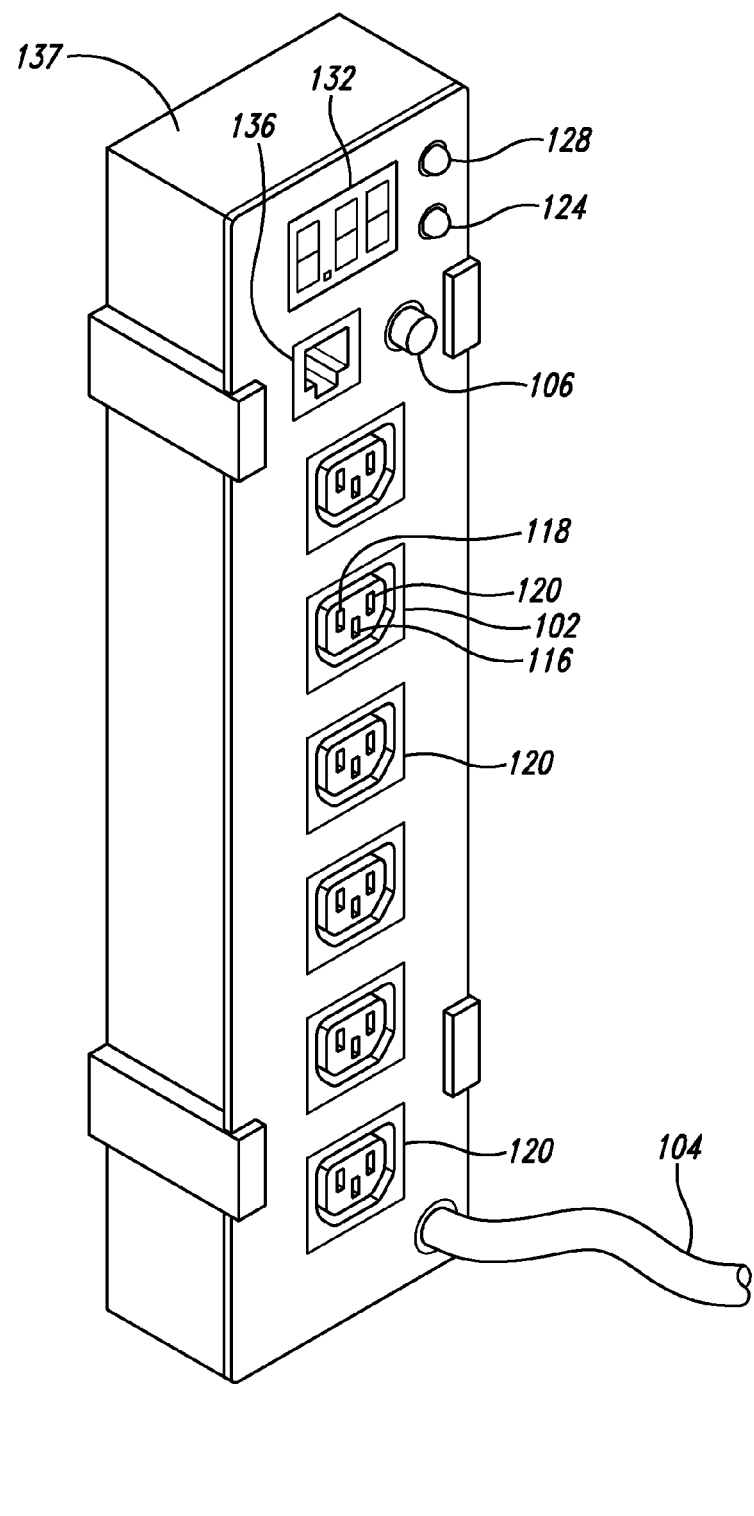
FIG. 11 is a front perspective view of a single front column implementation of the power distribution unit.

A single front column implementation of the power distribution unit 100 is shown in FIG. 11 as having the electrical receptacles 102 on the same side as the LED (LD3) 124 of the power indicating circuit 122, the LED (LD2) 128 of the ground indicating circuit 126, the true RMS current meter monitoring display 132, and the RJ45 connector 136 so that they all can be forward facing if desired. In this column implementation, the electrical receptacles 102 are arranged in a vertical fashion.

Figure 12:
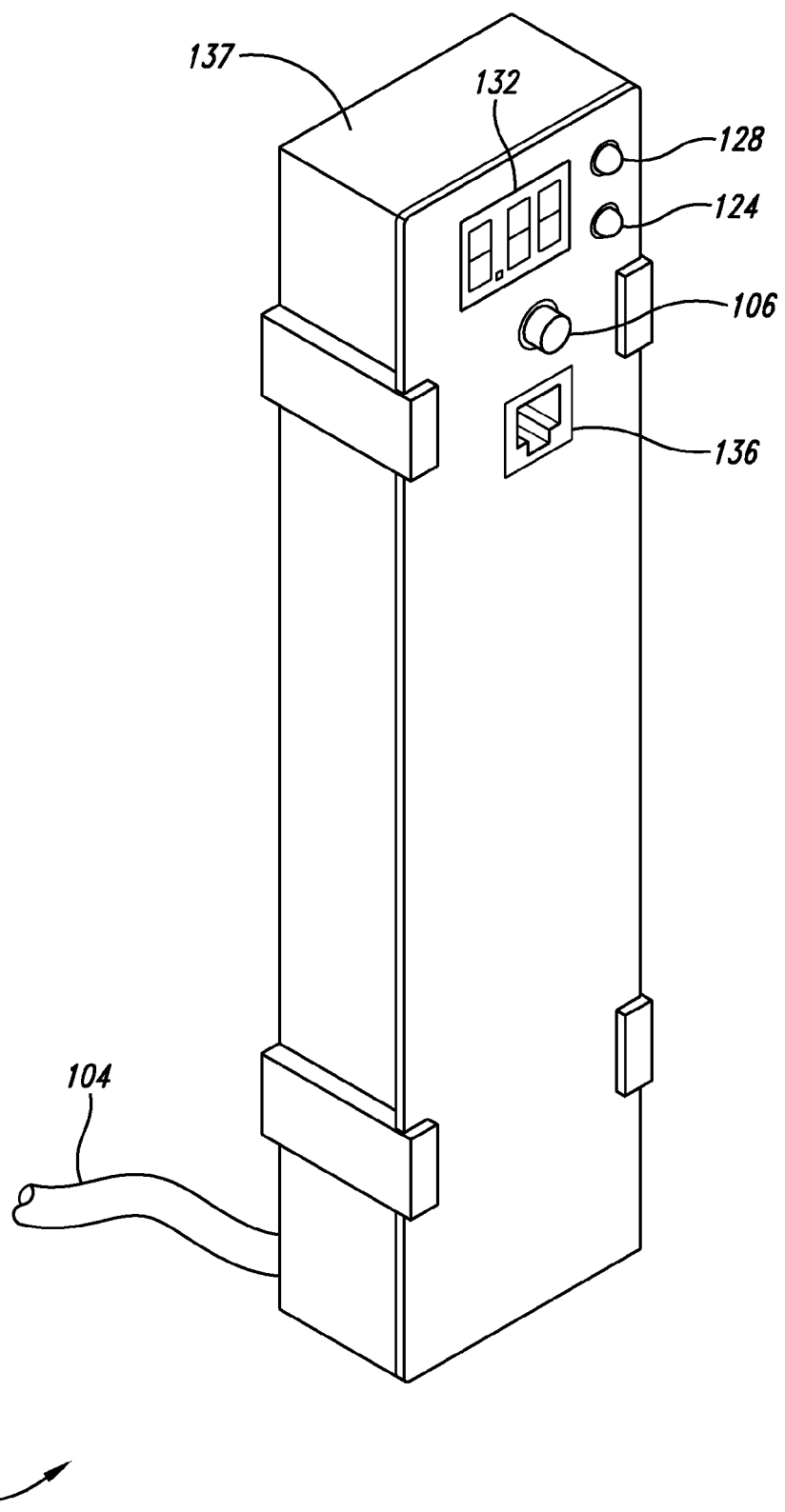
FIG. 12 is a front perspective view of a single rear column implementation of the power distribution unit.
Figure 13:
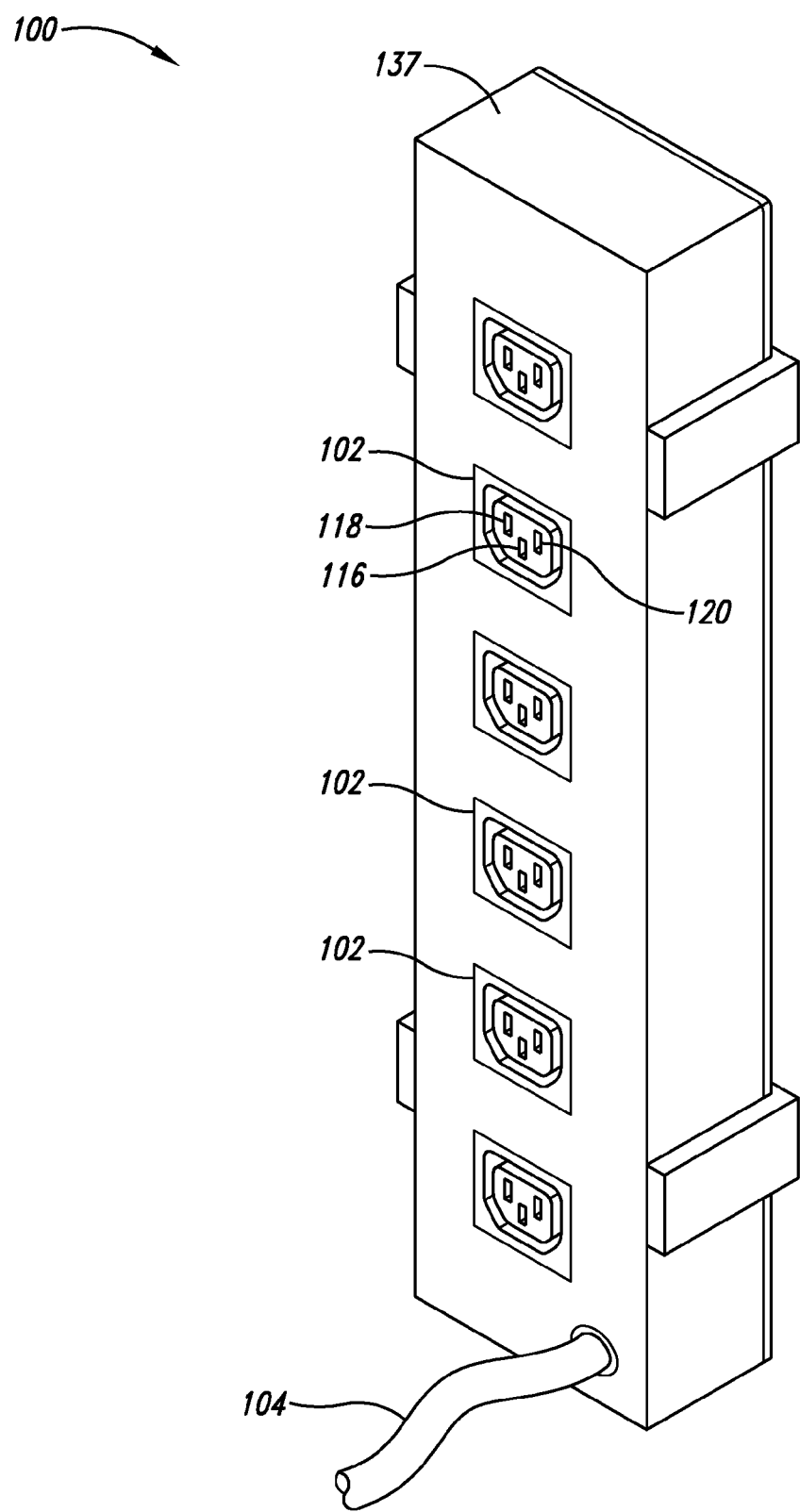
FIG. 13 is a rear perspective view of a single rear column implementation of the power distribution unit of FIG. 12.

A single rear column implementation of the power distribution unit 100 is shown in FIG. 12 and FIG. 13 as having the electrical receptacles 102 rearward facing when the power distribution unit is mounted in the equipment rack 140, on a side opposite the LED (LD3) 124 of the power indicating circuit 122, the LED (LD2) 128 of the ground indicating circuit 126, the true RMS current meter monitoring display 132, and the RJ45 connector 136 which are rearward facing when mounted in the equipment rack 140.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A power distribution unit for electrically coupling with an electrical ground and an electrical power source having a first phase line carrying a first current having a first phase and a second phase line carrying a second current having a second phase, the second phase being offset from the first phase, the power distribution unit comprising:
    a chassis;
    a two pole circuit breaker mechanically coupled to the chassis, the two pole circuit breaker having a first input terminal, a second input terminal, a first output terminal, and a second output terminal,
    in a first condition the first input terminal being electrically coupled to the first output terminal, in the first condition the second input terminal being electrically coupled to the second output terminal,
    in a second condition the first input terminal being electrically uncoupled from the first output terminal, in the second condition the second input terminal being electrically uncoupled from the second output terminal,
    the two pole circuit breaker configured to monitor a first level of electrical current flowing between the first input terminal and the first output terminal and a second level of electrical current flowing between the second input terminal and the second output terminal, the two pole circuit breaker being further configured to change from the first condition to the second condition when at least one of the first level and second level of electrical current becomes greater than a predetermined threshold,
    the first input terminal configured for coupling with the first phase line of the electrical power source, the second input terminal configured for coupling with the second phase line of the electrical power source;
    a plurality of electrical receptacles mechanically coupled to the chassis and accessible from outside the chassis, each of the receptacles having a first connector, a second connector, and a third connector, the first connector electrically coupled to the first output terminal of the two pole circuit breaker, the second connector electrically coupled to the second output terminal of the two pole circuit breaker, and the third connector electrically coupled to the electrical ground; and
    a ground indicating circuit comprising an optoisolator coupled between the second output terminal of the two pole circuit breaker and the electrical ground and between the first output terminal and the second output terminal of the two pole circuit breaker, the ground indicating circuit being configured to indicate whether the third connectors of the plurality of electrical receptacles are electrically coupled to the electrical ground.

2. The power distribution unit of claim 1, further comprising:
    a first light emitting diode mechanically coupled to the chassis and electrically coupled between the first and second output terminals of the two pole circuit breaker to indicate a power condition; and
    a second light emitting diode mechanically coupled to the chassis and electrically coupled to the ground indicating circuit to indicate a ground condition.

3. The power distribution unit of claim 1, wherein a voltage across the first phase line and the second phase line of the electrical power source is approximately 208 volts.

4. The power distribution unit of claim 1, further comprising a current meter mechanically coupled to the chassis, and electrically coupled between the first output terminal of the two pole circuit breaker and the first connector of each of the plurality of electrical receptacles.

5. The power distribution unit of claim 4, wherein the current meter comprises a display,
    the chassis further includes a first side, and
    both the display of the current meter and the plurality of receptacles are positioned on the first side of the chassis with the display viewable from outside the chassis.

6. The power distribution unit of claim 4, wherein the chassis further includes a first side and an opposite facing second side,
    the current meter has a display viewable from outside the chassis positioned on the first side of the chassis, and
    the plurality of receptacles are positioned on the second side of the chassis.

7. The power distribution unit of claim 1, wherein at least a portion of the plurality of receptacles are arranged in a row in the chassis.

8. The power distribution unit of claim 7 for use with an equipment rack, wherein the chassis includes brackets for mounting to the equipment rack.

9. The power distribution unit of claim 7, wherein the chassis includes an RJ45 connector to provide Ethernet connectivity.

10. A power distribution unit for mounting to an equipment rack and electrically coupling with an electrical power source having a first phase line carrying a first current having a first phase and a second phase line carrying a second current having a second phase, the second phase being offset from the first phase, the power distribution unit comprising:
   a chassis configured for mounting in the equipment rack;
   a two pole circuit breaker residing inside the chassis, the two pole circuit breaker having a first input terminal, a second input terminal, a first output terminal, and a second output terminal, the first input terminal configured for coupling with the first phase line of the electrical power source, the second input terminal configured for coupling with the second phase line of the electrical power source, the two pole circuit breaker being configured to detect an overcurrent condition between the first input terminal and the first output terminal and between the second input terminal and the second output terminal, when the two pole circuit breaker detects an overcurrent condition either between the first input terminal and the first output terminal or between the second input terminal and the second output terminal, the two pole circuit breaker being configured to electrically disconnect both the first input terminal from the first output terminal and the second input terminal from the second output terminal;
   a plurality of electrical receptacles supported by the chassis, each of the receptacles having a first connector, a second connector, and a third connector, the first connector electrically coupled to the first output terminal of the two pole circuit breaker, the second connector electrically coupled to the second output terminal of the two pole circuit breaker, and the third connector electrically coupled to an electrical ground; and
   a ground indicating circuit having a first circuit portion and a second circuit portion, the first circuit portion being connected to both the second output terminal and the electrical ground, and the second circuit portion being connected to both the first output terminal and the second output terminal, the ground indicating circuit comprising an optoisolator coupled to both the first circuit portion and the second circuit portion, the second circuit portion comprising a first light emitting device electrically isolated from the electrical ground by the optoisolator, the first light emitting device being configured to illuminate only when the third connectors of the plurality of electrical receptacles are electrically coupled to the electrical ground.

11. The power distribution unit of claim 10, further comprising:
   a current meter electrically coupled to the first output terminal of the two pole circuit breaker and electrically coupled to the first connector of each of the plurality of electrical receptacles.

12. The power distribution unit of claim 11, wherein the chassis has a first side, the current meter and the plurality of receptacles being positioned on the first side.

13. The power distribution unit of claim 11, wherein the chassis has a first side and an opposite facing second side, the current meter having a display positioned on the first side and the plurality of receptacles positioned on the second side.

14. The power distribution unit of claim 10, wherein a voltage across the first phase line and the second phase line of the electrical power source is approximately 208 volts.

15. The power distribution unit of claim 10, for use with an equipment rack, wherein the chassis includes brackets for coupling to the equipment rack.

16. A method performed by a power distribution unit comprising a two pole circuit breaker having a first input terminal, a second input terminal, a first output terminal, a second output terminal, and a plurality of electrical receptacles, each of the receptacles having a first connector, a second connector, and a third connector, the first connector electrically coupled to the first output terminal of the two pole circuit breaker, the second connector electrically coupled to the second output terminal of the two role circuit breaker, the third connector electrically coupled to an electrical ground, the first input terminal being electrically coupled to a first phase line carrying a first current having a first phase, the second input terminal being electrically coupled to a second phase line carrying a second current having a second phase, the second phase being offset from the first phase, the method comprising:
   when the third connectors of the plurality of electrical receptacles are electrically coupled to the electrical ground, directing electrical current from the second output terminal to the electrical ground through an optoisolator;
   when current flows through the optoisolator, the optoisolator powering a light emitting device isolated from the electrical ground by the optoisolator thereby illuminating the light emitting device, the illuminated light emitting device being viewable from outside the power distribution unit and indicating the third connectors of the plurality of electrical receptacles are electrically coupled to the electrical ground;
   monitoring an electrical condition between the first input terminal and the first output terminal;
   monitoring an electrical condition between the second input terminal and the second output terminal; and
   electrically uncoupling the first output terminal from the first input terminal and electrically uncoupling the second output terminal from the second input terminal when an undesired electrical condition occurs between at least one of the first input terminal and the first output terminal, and the second input terminal and the second output terminal.

17. The method of claim 16, further comprising:
   illuminating a second light emitting device viewable from outside the power distribution unit only when the first input terminal is electrically coupled to the first output terminal and the second input terminal is electrically coupled to the second output terminal.

18. The method of claim 16, further comprising:
   displaying a true root mean squared current value for current flowing between the first output terminal and the first connectors of the plurality of electrical receptacles.

19. The method of claim 16, further comprising:
   displaying a true root mean squared current value for current flowing between the second output terminal and the second connectors of the plurality of electrical receptacles.

20. The power distribution unit of claim 1, wherein the optoisolator comprises a photodiode and a phototransistor, the photodiode being coupled between the second output terminal of the two pole circuit breaker and the electrical ground and configured to illuminate when current is flowing between the second output terminal and the electrical ground, the phototransistor is coupled between the second output terminal and the first output terminal of the two pole circuit breaker and configured to allow current to flow between the second output terminal and the first output terminal when the photodiode is illuminated, and the ground indicating circuit further comprises an indicator that indicates the third connectors of the plurality of electrical receptacles are electrically coupled to the electrical ground when the phototransistor allows current to flow through the indicator and between the second output terminal and the first output terminal.

21. The power distribution unit of claim 20, wherein the indicator comprises an indicator photodiode coupled to the phototransistor and configured to illuminate when the phototransistor allows current to flow through the indicator photodiode and between the second output terminal and the first output terminal.

22. The power distribution unit of claim 1, further comprising a true root mean squared current meter having a display viewable from outside the chassis, and the true root mean squared current meter being electrically coupled between the first output terminal of the two pole circuit breaker and the first connector of each of the plurality of electrical receptacles.

23. The power distribution unit of claim 22, wherein the display is a digital display.

24. The power distribution unit of claim 10, further comprising:

a second light emitting device configured to illuminate only when the first input terminal is electrically coupled to the first output terminal and the second input terminal is electrically coupled to the second output terminal.

* * * * *